United States Patent [19]
Ng et al.

[11] Patent Number: 5,185,819
[45] Date of Patent: Feb. 9, 1993

[54] VIDEO SIGNAL COMPRESSION APPARATUS FOR INDEPENDENTLY COMPRESSING ODD AND EVEN FIELDS

[75] Inventors: Sheau-Bau Ng; Rajesh Hingorani, both of Plainsboro, N.J.

[73] Assignee: General Electric Company, Princeton, N.J.

[21] Appl. No.: 692,848

[22] Filed: Apr. 29, 1991

[51] Int. Cl.$^5$ .............................................. G06K 9/36
[52] U.S. Cl. ................................ 382/56; 358/133; 358/135; 358/136
[58] Field of Search ............... 358/133, 135, 136, 137, 358/138; 382/56

[56] References Cited

U.S. PATENT DOCUMENTS

| | | | |
|---|---|---|---|
| 4,675,733 | 6/1987 | Tanimoto | 358/136 |
| 4,704,628 | 11/1987 | Chen et al. | 358/136 |
| 4,999,704 | 3/1991 | Ando | 358/136 |
| 5,018,010 | 5/1991 | Masumoto | 358/136 |
| 5,040,061 | 8/1991 | Yonemitsu | 358/136 |

OTHER PUBLICATIONS

International Organization for Standardization, ISO-IEC JTC1/SC2/WG11, "Coding of Moving Pictures and Associated Audio", MPEG Video Committee Draft, MPEG 90/176 Rev. 2, Dec. 18, 1990.

Feng-Ming Wang, "High Quality Coding of the Even Fields Based on the Odd Fields of Interlaced Video Sequences", IEEE Transactions on Circuits and Systems, vol. 38, No. 1, Jan. 91, pp. 140-142.

Primary Examiner—Jose Couso
Attorney, Agent, or Firm—Joseph S. Tripoli; Eric P. Herrmann; Ronald H. Kurdyla

[57] ABSTRACT

In a video compression system odd and even fields of video signal are independently compressed in sequences of intraframe and interframe compression modes. The odd and even fields of independently compressed data are interleaved for transmission. The fields are interleaved such that intraframe even field compressed data occurs midway between successive fields of intraframe odd field compressed data. The interleaved sequence provides receivers with twice the number of entry points into the signal for decoding without increasing the amount of data transmitted.

7 Claims, 4 Drawing Sheets

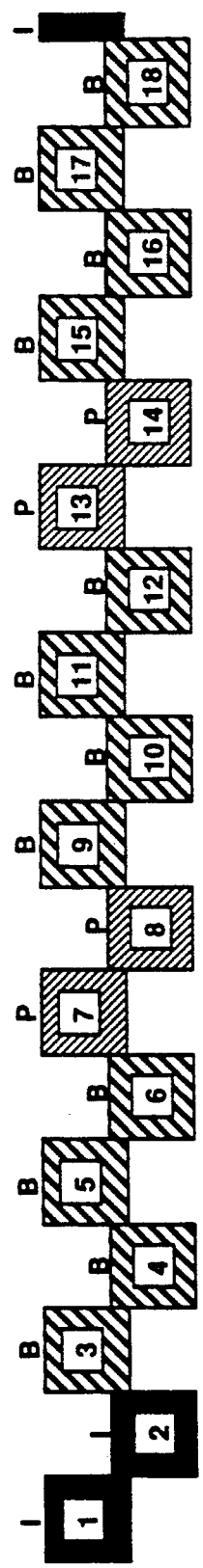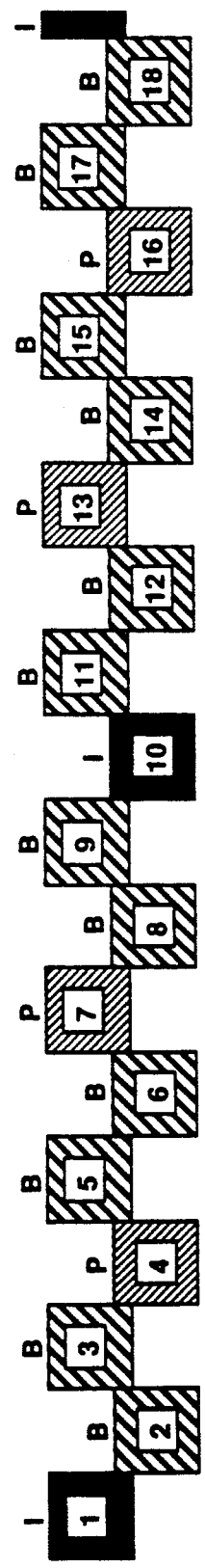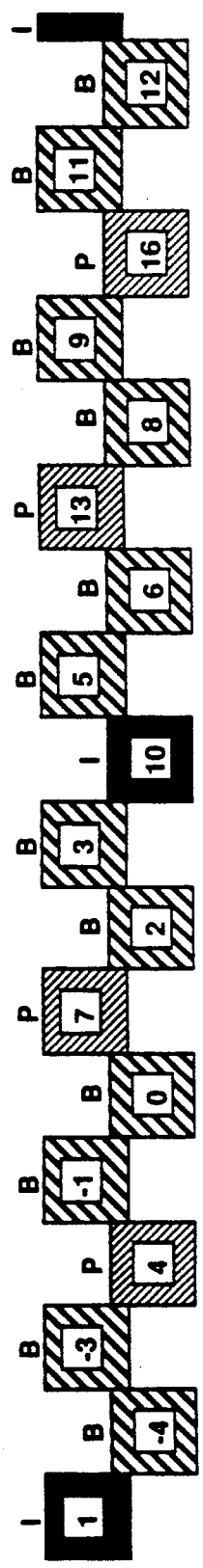

VIDEO SIGNAL COMPRESSION APPARATUS FOR INDEPENDENTLY COMPRESSING ODD AND EVEN FIELDS

This invention relates to apparatus for compressing/decompressing video data as for recording or transmission.

BACKGROUND OF THE INVENTION

Over the past two decades significant effort has been committed to the compression of digitized video signals for purposes of image storage and transmission. As a result many types of compression techniques have evolved including the use of discrete cosine transforms, sub-band encoding, pyramid transforms, intraframe encoding, interframe encoding and combinations of the above to name a few. More recently the International Organization for Standardization has developed a video compression standard for use with personal computer and workstation displays. This proposed standard is described in the document "Coding of Moving Pictures and Associated Audio", ISO-IEC JTC1/SC2/WG11, MPEG 90/176 Rev. 2; Dec. 18, 1990. Hereinbelow this system will be referred to as MPEG.

A feature of the MPEG standard is the use of both intraframe and interframe coding techniques in combination with discrete cosine transforms, run length encoding and statistical (Huffman) encoding. Intraframe encoding in general terms involves the encoding of an image frame from a single source frame to provide sufficient encoded data for reconstruction of an image from only the intraframe encoded data. Interframe encoding is the generation of encoded frame data from, for example, the differences between information from a current source frame and a frame predicted from prior frames. As such images may not be reconstructed from a frame of interframe encoded data without information from prior frames. The MPEG system incorporates two types of interframe encoding. The first develops predictive frames (designated P frames) from the current frame and a single prior frame. The second develops bidirectionally predictive frames (designated B frames) from the current frame and one or both of a prior and a subsequent frame. For example, assume that frames occur in a sequence F1, F2, F3, F4 ... and that frame F1 is to be intraframe encoded (designated I frame), frames F2 and F3 are to be B frame encoded and frame F4 is to be P frame encoded. The P encoded frame is developed from differences between frame F4 and a predicted frame generated from a decoded version of I frame F1 only. The B encoded frame representing frame F2 (F3) is developed from differences between frame F2 (F3) and predicted frames generated from both a decoded version of I frame F1 and a decoded version of P frame F4. Exemplary circuitry for generating I, B and P encoded frames is described in "A Chip Set Core for Image Compression", by Alvin Artieri and Oswald Colavin, available from SGS-Thomson Microelectronics, Image Processing Business Unit, 17 avenue des Martyrs-B.P. 217, 38019 Grenoble Cedex France.

An exemplary sequence of I, B and P encoded frames is illustrated in FIG. 1A. In FIG. 1A the upper blocks correspond to odd fields of interlaced image data, and the lower blocks correspond to even fields of interlaced image data. The MPEG system protocol designates that only the odd fields of respective frames are to be encoded. The exemplary sequence includes 9 frames of I, B and P encoded data which sequences occur cyclically. The amount of encoded data of I frames is significantly greater than the amount of encoded data of P frames, and the amount of encoded data of B frames is less than that of encoded P frames. The number of P frames between I frames and the number of B frames between P or I and P frames is variable, i.e., it is user selectable within certain constraints. Nominally this selection is dependent upon the channel bandwidth and image content.

The level of encoding provided by the MPEG protocol (e.g., odd fields only and a continuous data transfer rate of 1.5M bits/S) is sufficient to produce acceptable images in the computer display environment. However, those skilled in the art of television signal processing will readily recognize that the MPEG protocol as defined will not provide images of current broadcast quality. It will also be recognized that minor modifications to the protocol will provide sufficient data to produce broadcast quality television images or even HDTV images. These changes include doubling the number of fields to be encoded as well as increasing the number of lines per field and the number of pixels per line. However, even with such modifications to the MPEG protocol, certain deficiencies will still exist to preclude acceptable performance with respect to image reception.

Regarding the TV environment, a first deficiency of the MPEG system is the timing latency of image production upon receiver turn on or channel change. An image cannot be reproduced until an intraframe encoded frame of data is available to the receiver. For the sequence of encoded frames shown in FIG. 1A, in the worst case, image reproduction has a latency of at least nine frame intervals. A second deficiency resides in the duration of image corruption due to corruption or loss of data in data transmission. That is, if data for an encoded I frame is lost or corrupted, the images reproduced during the succeeding eight frames may be in error, which error may become cumulatively worse over the interval.

According to the present invention an encoding system incorporating both intraframe and interframe encoding is provided which ameliorates the foregoing deficiencies.

SUMMARY OF THE INVENTION

The present invention is directed toward a video signal encoding apparatus for generating compressed video data for transmission. The apparatus includes circuitry to independently encode alternate fields/frames of video signal according to respective sequences of alternating intraframe and interframe encoding processes. That is, for example, the odd fields are encoded according to a first I, B and P frame encoding sequence and the even fields are encoded according to a second I, B and P frame encoding sequence. Intraframe encoded fields of the even field sequence are arranged to occur approximately halfway between successive intraframe encoded fields of the odd field sequence. The encoded odd and even fields are interleaved for transmission.

BRIEF DESCRIPTION OF THE DRAWINGS

FIGS. 1A, 1B AND 1C are pictorial representations of encoded sequences of fields of video signal, useful for describing the invention.

DETAILED DESCRIPTION

Figure 2:
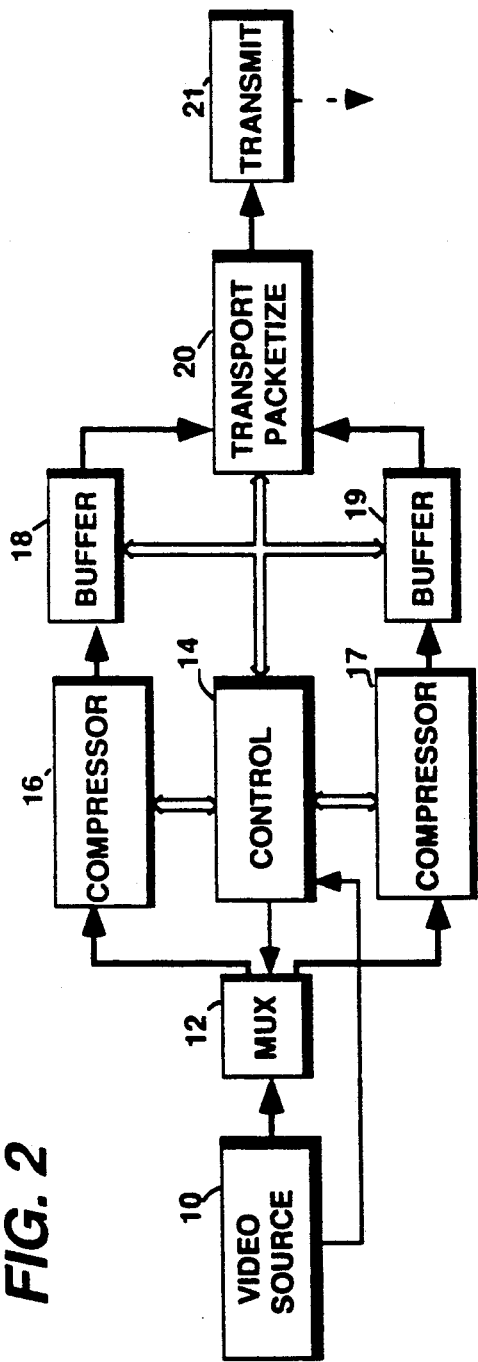
FIG. 2 is a block diagram of an exemplary video signal encoding system embodying the present invention.

The invention will be described in terms of the MPEG field/frame protocol, however it should be appreciated that it is applicable to any encoding format that provides cyclic sequences of intraframe and interframe compressed signal.

Referring to FIG. 1A, the row of boxes corresponds to respective fields of encoded video signal. Even and odd numbered boxes correspond to even and odd fields respectively. The type of encoding applied to the respective fields (I, B or P) is indicated by the letter above each box. As indicated above, the sequence of odd fields corresponds to the MPEG protocol. Adding the even fields to the sequence, increasing the number of lines per field and the number of pixels per line modifies the protocol to provide sufficient information for television image reproduction.

FIG. 1B illustrates an improved coding format, according to the invention, for reducing image reproduction latency and concealing signal transmission data loss or corruption. In FIG. 1B the even fields are encoded independently of the odd fields and the intraframe encoded fields are offset by approximately one half the number of fields in the cyclic sequence. The advantages that flow from the FIG. 1B sequence are as follows. To begin image reproduction an I field/frame is required. The sequence of FIG. 1B includes an I field/frame every 9 fields whereas the sequence of FIG. 1A includes an I field/frame only every 17 fields. Thus the FIG. 1B sequence provides signal entry points at intervals one-half as long as the intervals of the sequence of FIG. 1A, without increasing the amount of coded data. An image may be reproduced from only even field data or only odd field data, albeit with half vertical resolution. However, for providing images during channel scans (sequencing through channels), and at startup, the rapidly reproduced lower resolution image is significantly more acceptable than waiting twice as long for a full resolution image. Regarding error concealment, assume that data is lost from a portion of the I fields 1 and 2 of FIG. 1A. This lost data will affect the reproduction of the images from fields 1-18, and may induce unacceptable image artifacts. Consider the loss of an equivalent amount of data from fields 1 and 2 of the sequence of FIG. 1B. Data lost from field 2 will only affect the reproduced image corresponding to field 2 since field 2 is bidirectionally predictive encoded. Data lost from the odd I field 1 has the potential of affecting all of the odd fields in the sequence, and thus corrupt all of the frames in the sequence. However, on detection of lost data in the odd field sequence, data from the even field sequence may be substituted for display. Such substitution will momentarily provide less image resolution, but this is far more acceptable than corrupted images.

FIGS. 1A and 1B illustrate sequences of fields as they normally occur (disregarding the type of encoding). FIG. 1C illustrates a field sequence as it would be transmitted in an MPEG system. Recall that, for example, bidirectionally predictive encoded fields 3 and 5 are generated in part from I field 1 and P field 7. In order to decode the B fields 3 and 5, I field 1 and P field 7 must have been previously decoded. Therefore, to facilitate decoding and reduce the amount of data storage required in receivers, the encoded B fields are arranged to follow the occurence of I and P fields from which decoding depends. This field transmission arrangement illustrated in FIG. 1C corresponds to the coding sequence of FIG. 1B.

Apparatus for encoding video signal according to, e.g., the field format of FIG. 1C is illustrated in FIG. 2. Video signal is provided by a source 10, which may include a video camera and preprocessing circuitry. The preprocessing circuitry provides fields of video signal according to an interlaced scan format and in pulse code modulated format (PCM). Typically the source 10 will provide luminance, Y, and chrominance, U and V, color difference signals, but for purposes of this disclosure they will be referred to jointly as the video signal. Nominally the luminance and chrominance signals are independently compressed or encoded and then combined for transmission, but those persons skilled in the art of video signal compression will be aware of these techniques and readily be able to implement same.

The video signal from the source 10 is coupled to a multiplexer 12 which passes even fields of video data to a first compressor apparatus 16 and odd fields of video data to a second compressor apparatus 17. The multiplexer 12 is controlled by a system control circuit 14, which is responsive to field interval timing signals provided by the video source 10.

Compressor 16 is conditioned by the control circuit 14 to compress respective even fields of video data according to a predetermined sequence of intraframe and interframe coding modes, e.g., I, B, P modes. Compressed video data is applied to a buffer memory 18. Compressed data from the buffer 18 is coupled to a transport packetizing circuit 20. The packetizing circuit 20 includes circuitry for parsing the data into blocks of predetermined amounts of data including header information to identify each block as well as information such as Barker codes for synchronizing the detection of respective blocks at corresponding receiver apparatus. The circuit 20 may also include error correction circuitry for appending error check codes to the data to be transmitted. The error correction circuitry may be in the form of a Reed-Solomon error correction encoder. The transport blocks are coupled to a transmitter 21 which may be simply a data bus or as complicated as a broadcast transmitter. In the latter instance the transport blocks of data may be conditioned to quadrature amplitude modulate (QAM) a carrier signal for application to a transmission antenna.

Compressor 17 is conditioned by the system controller 14 to compress the odd fields of video data according to a predetermined sequence of intraframe and interframe encoding modes, e.g., I, B, P. The mode sequence may be similar to the mode sequence applied to the even fields, or it may be an alternative sequence. In either event the mode sequence applied to the odd fields is selected so that intraframe encoded odd fields occur approximately midway between intraframe encoded even fields, or vice versa.

Compressed odd field video data provided by the compressor 17 is coupled to the transport packetizer circuit 20, via a buffer memory 19.

The transport packetizer circuit is conditioned by the control circuit 14 to alternately operate on even fields of compressed data provided by the buffer 18 and odd fields of compressed data provided by the buffer 19.

The buffers 18 and 19 are included because the amount of compressed data for respective fields differ according to the compression mode employed and the detail attendant the image represented by the field of video data. The differences in amounts of data result in fields of compressed data occupying different time intervals, and thus data output by the compressors 16 and 17 may not occur at convenient times for interleaving the odd and even fields of compressed data. The buffers provide accommodation for the differences in occurrence of the compressed data provided by the respective compressors.

The apparatus of FIG. 2 is shown with first and second separate compression circuits for compressing the even and odd fields of data. It should be appreciated that a single compressor may be employed to perform compression of both the even and odd fields.

Figure 3:
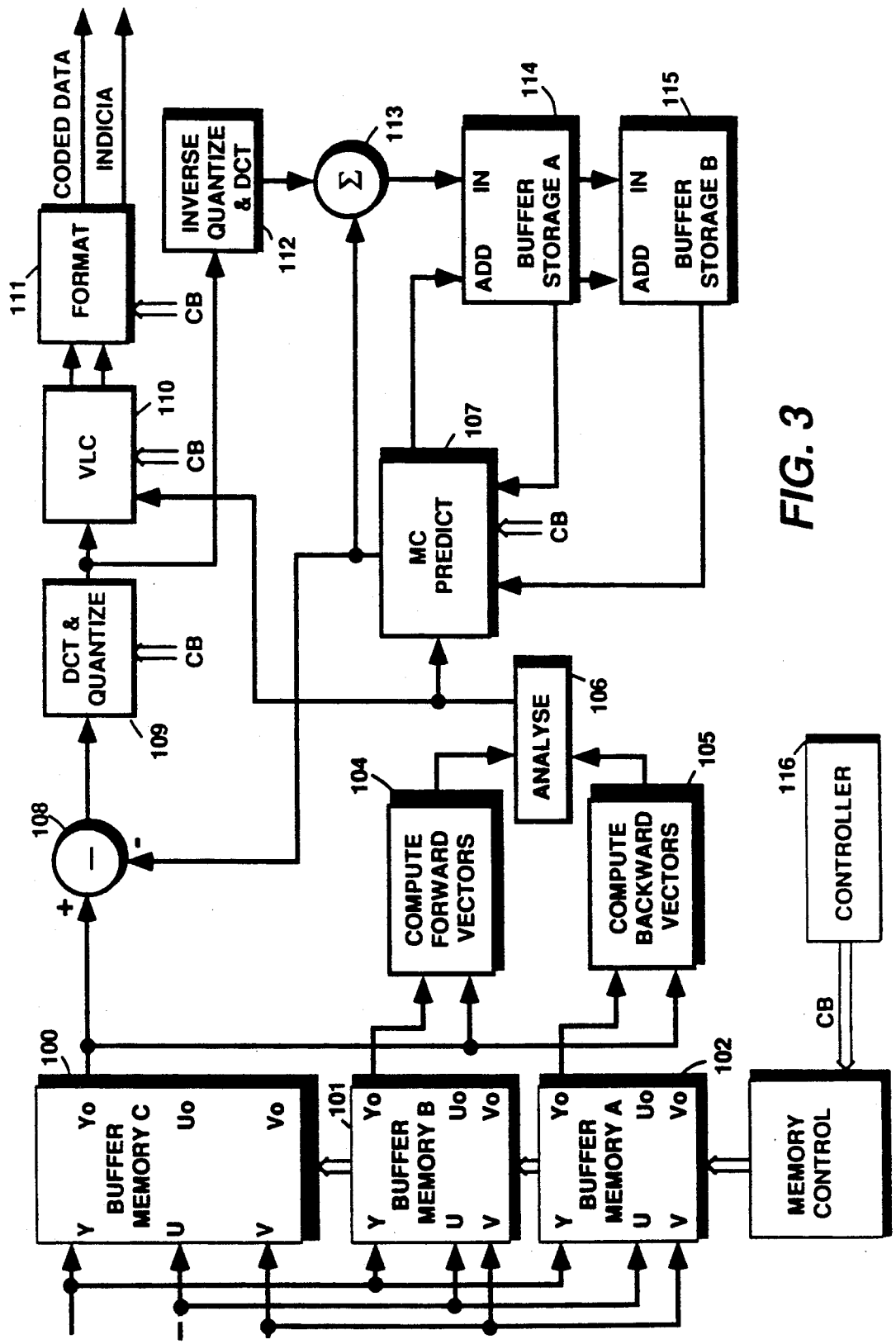
FIG. 3 is a block diagram of an exemplary video signal compression apparatus.

FIG. 3 illustrates an exemplary compressor apparatus which may be utilized for compressing both even and odd fields according to the sequence illustrated in FIG. 1C. The assumption is made that source fields of video signal have been rearranged to occur in the numbered sequence shown in FIG. 1C. The compressor provides compressed data according to I, B, P modes. Intraframe compression consists of performing discrete cosine transforms over 8×8 blocks of pixels and then variable length encoding the transform coefficients. Predictive compression (P fields) consists of determining motion vectors which indicate 16×16 blocks of pixels from a prior I (or P) field which most closely correspond to 16×16 blocks of pixels in the current field. A predicted field is generated using the motion vectors and data from the prior I field, and the predicted field is subtracted from the current field on a pixel by pixel basis to generate residues. A discrete cosine transform is then performed on 8×8 blocks of the residues. The transform coefficients of the residues are variable length encoded, and the motion vectors plus the residue coefficients are non additively combined to form coded P fields. Bidirectional predictive fields (B) are formed similarly to the P fields except that the motion vectors and corresponding residues are associated with both prior occurring and subsequent fields of video data.

The apparatus shown only includes the circuitry required to generate compressed luminance data. Similar apparatus is required to generate compressed chrominance U and V data. In FIG. 3 the memory and storage elements 101, 102, 114 and 115 are each arranged to store an odd field of data and an even field of data in separate memory sections. When an even (odd) field is being processed the sections of the respective memory and storage elements designated for storing even (odd) fields are accessed. In addition there are elements 104 and 105 designated as elements for computing forward and backward motion vectors respectively. Since whether a motion vector is forward or backward depends only upon whether the current field is analyzed with respect to a prior or succeeding field, both elements are realized with similar circuitry, and in fact both elements 104 and 105 alternate on a field-/frame basis between generating forward and backward vectors. The elements 104 and 105 may be realized using integrated circuits of the type designated STI 3220 MOTION ESTIMATION PROCESSOR available from SGS-THOMSON MICROELECTRONICS. In order to achieve the necessary processing rates each of the elements 104 and 105 may comprise a plurality of such integrated circuits operating simultaneously on different areas of respective images.

Element 109 designated DCT and Quantize performs the discrete cosine transform and quantization of transform coefficients and may be realized using integrated circuits of the type designated STV 3200 DISCRETE COSINE TRANSFORM available from SGS-THOMSON MICROELECTRONICS. Element 109 may also be realized with a plurality of such devices operated in parallel to concurrently process different areas of the image.

Even and odd fields occur alternately and sequentially, and the compressor of FIG. 3 alternately compresses odd and even fields. Compression of even and odd fields is similar except for the relative sequence of intra and interframe compression modes. The sequence is programmed into the controller 116 for both even and odd field sequences, and communicated to the respective processing elements via a control bus CB. Since the compression function is conceptually the same for both even and odd field sequences, an explanation of only the even field compression will be provided below.

Refer to FIG. 1C and assume that even field 10 is currently available. Previously occurring even P field 4 has been snatched and stored in the even field section of the buffer memory B 101. In addition a previously generated predicted even field 4 has been stored in the even field section of one of the buffer storage elements 114 or 115. As field 10 occurs it is stored in the even field section of the buffer memory A, 102. In addition field 10 is applied to a working buffer memory 100. As field 10 occurs, appropriate blocks of image data are coupled from the memory 100 to the minuend input of a subtracter 108. During compression of the I fields the subtrahend input of the subtracter 108 is held at a zero value so that data passes through the subtracter 108 unaltered. This data is applied to the DCT and quantizer element 109 which provides quantized transform coefficients to elements 110 and 112. Element 112 performs inverse quantization and inverse DCT transformation of the coefficients to generate a reconstructed image. The reconstructed image is applied via an adder 113 to, and stored in, the even field section of one of the buffer storage elements 114 and 115 for use in compressing subsequent B and P fields. During compression of I frames no information is added (by adder 113) to the reconstructed image data provided by element 112.

Element 110 performs variable length encoding (VLC) of the DCT coefficients generated by element 109. The VLC codewords are applied to a formatter 111 which segments the data and appends appropriate header information to facilitate decoding. Coded data from element 111 is then passed to a further buffer memory (not shown). The formatter may also be arranged to provide field indicia to the transport packetizing circuit for generating corresponding transport block headers. Each of the elements 109, 110 and 111 are controlled by the system controller 116 to cyclically perform the appropriate operations at the appropriate times.

After the occurrence and compression of even field 10 an even field 6 (B) occurs and is loaded into buffer memory 100. Data from even field 6 is coupled to both of elements 104 and 105. Element 104, responsive to data from even field 6 stored in memory 100 and data from even field 4 stored in memory 101, calculates forward motion vectors for respective blocks of 16×16 pixels of image data. It also provides a distortion signal which is indicative of the relative accuracy of the respective forward motion vectors. The forward motion vectors and the corresponding distortion signals are coupled to an analyzer 106.

Element 105, responsive to data from field 6 stored in memory 100 and data from I field 10 stored in memory 102, generates backward motion vectors and corresponding distortion signals which are also coupled to the analyzer 106. Analyzer 106 compares the distortion signals against a threshold, and if both exceed the threshold, provides both the forward and backward motion vectors as the motion vector, and also provides a corresponding signal related to the ratio of the distortion signals. Upon reconstruction predicted images are generated using both forward and backward vectors and corresponding field data from which derived. An interpolated field is generated from the forward and backward predicted fields in accordance with the ratio of distortion signals. If the distortion signals for both the forward and backward motion vectors are less than the threshold, the motion vector with the corresponding lesser valued distortion signal is selected as the block motion vector.

After the motion vector has been determined, it is applied to the motion compensated predictor 107 which accesses the appropriate data block defined by the vector from the previously regenerated field 10 or field 4 or both, stored in the even field sections of the storage elements 114 and 115. This data block is applied to the subtrahend input of the subtracter 108 wherein it is subtracted on a pixel by pixel basis from the corresponding block of pixel data from the current field 6 provided by the buffer memory 100. The differences or residues are then encoded in element 109 and the coefficients applied to element 110. The corresponding block vector (or vectors) is also applied to element 110. The motion vectors are variable length encoded in element 110. The coded vectors and coefficients are then transferred to the formatter 111. The encoded B fields are not inverse quantized and inverse transformed in element 112 since they are not used for subsequent encoding.

P fields are similarly encoded except that only forward motion vectors are generated. For example P field 16 is encoded with motion vectors associating corresponding blocks of I field 10 and P field 16. During encoding of P fields, element 112 provides corresponding decoded residues and element 107 provides the corresponding predicted P field. The predicted field and the residues are added in adder 113 on a pixel-by-pixel basis to generate the reconstructed field which is stored in the even field section of the one of storage elements 114 and 116 not containing the even field information from which the predicted even P field is generated. The reconstructed and stored even P field is used for encoding subsequent even B fields. For both P and B fields it should be noted that DCT's are performed on a block basis (e.g., a matrix of 8×8 pixels), but motion vectors are calculated for macroblocks (e.g., a 2×2 matrix of luminance of blocks or a 16×16 matrix of pixels).

Figure 3A:
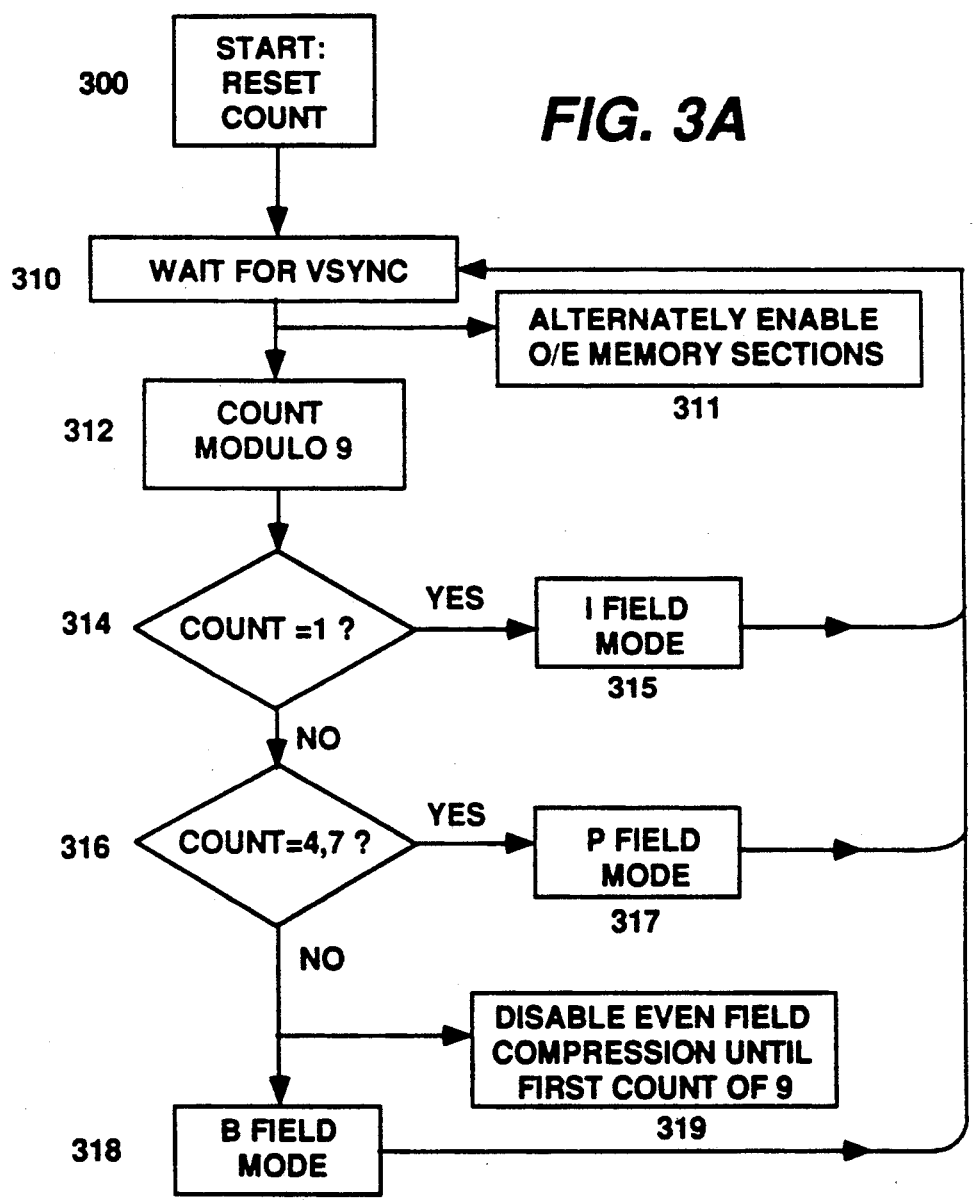
FIG. 3A is a flow chart of the sequencing operation of the compression apparatus of FIG. 3.

FIG. 3A illustrates the mode control operation of the controller 116 of FIG. 3, for a coding sequence corresponding to FIG. 1C. At 300, upon startup, a counter 312 is reset to zero, compression of even numbered fields is disabled (319), and the even field sections of the memory and storage elements 101,102,114 and 115 are enabled (311). Thereafter the even and odd field sections of the memory and storage elements are alternately enabled on a field basis. The system then waits (310) for a vertical sync pulse indicating the start of a field, and upon reception increments the counter by 1 to the count value 1. In addition, responsive to the vertical sync pulse the odd sections of the memory and storage elements 101,102,114 and 115 are enabled (311). The count value is tested (314) for a 1, and if true, the current field is compressed in the I mode. If the count is other than 1, it is again tested (316), this time for the values 4 or 7. If the count is 4 or 7 the field is compressed in the P mode, and if not, it is compressed in the B mode. Until the first count of 9, compression of even fields is inhibited (319) to preclude generation of excessive invalid data since compression of the even fields would start outside of the normal compression sequence. Thereafter compression of even fields is enabled, i.e. at field 10. The counter (312) is a modulo 9 counter which cyclically produces the values 1-9 inclusive. The second occurrence of a count value of 1 corresponds to field 10, and according to the test (314) will be compressed in the I mode. The second occurrence of count values 2 and 3 correspond to fields 5 and 6 which according to the test (316) will be compressed in the B mode. The next count of 1 corresponds to field 19 and so on. Referring to FIG. 1C, it may be seen that counting with this modulus will produce the field compression sequence illustrated.

Figure 4:
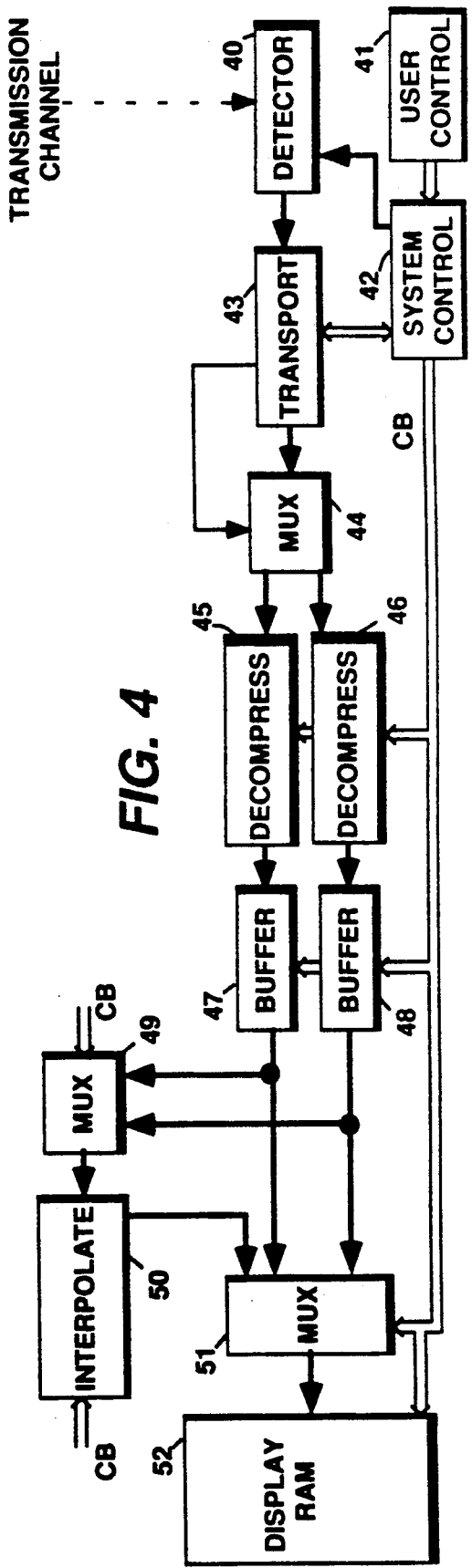
FIG. 4 is a block diagram of an exemplary video signal decoding system.

FIG. 4 illustrates an exemplary receiver apparatus for processing transmitted compressed video signal occurring as interleaved odd and even fields which have been independently encoded in sequences of intraframe and interframe encoding modes. The transmitted signal is detected by a detector 40 which may include a tuner, IF circuitry and a QAM demodulator. Detector 40 provides a signal in conformance with the signal provided by the transport packetizer 20 of FIG. 2. This signal is coupled to a transport processing circuit 43. Transport processing circuit 43 includes an error check/correction circuit, which, responsive to the error check codes appended to the transmitted signal, corrects signal errors incurred during transmission. If uncorrectable errors occurred a flag is generated and communicated to the receiver system controller 42. The transport processor 43, responsive to transport header information included in the transport blocks, identifies odd and even fields of data, and reconfigures the transmitted signal from transport block format, to a format which is in conformance with compressed information provided by the buffers 18 and 19 of FIG. 2. The reconfigured data is coupled to a multiplexer 44. A control signal, corresponding to the current field type (odd/even) is provided by the transport processor 43 to condition the multiplexer 44 to pass odd field data to a decompressor 45 and even field data to a decompressor 46. The decompressors 45 and 46 perform decompression of the odd and even field compressed video data respectively, and provide decompressed video signal to buffer memories 47 and 48.

In this example it is assumed that the compressed signal is of the form illustrated in FIG. 1C, but that the decompression circuitry 45 and 46 provide decompressed data reordered in the normal field sequence as per FIG. 1B, for example. The reordered fields from buffer memories 47 and 48 are coupled to a multiplexer 51 which, in the steady state with no loss or corruption of data, alternately couples odd and even fields of data to a video display RAM 52. It is assumed that the display RAM has sufficient storage capacity to hold one frame of data. Frames of data are thereafter read from the display RAM in either interlaced or non interlaced format for display purposes. The receiver apparatus is controlled by the controller 42 which is programmed to coordinate the decompression and display of received video data according to a normal cycle of operations.

Immediately after system turn-on or channel changes effected by user control 41, the system controller 42 initiates a start-up cycle to provide image reproduction as quickly as possible. Once image display of a full sequence of fields of data (a sequence encompassing two successive intraframe encoded mutually exclusive odd or even fields) has been accomplished, the controller switches to the normal decompression cycle of operation. At start-up or channel change, image reproduction cannot occur until at least one intraframe encoded field is received, since reproduction of interframe encoded fields (P or B) require data from an intraframe encoded field. The controller 43 monitors the field types received responsive to header data provided by the transport processor 43. The controller precludes decompression of any received field data until an intraframe encoded field is detected. Its field type (odd or even) is checked and decompression is performed on the successive fields of the same type as the first occurring intraframe encoded field. Decompression of fields of the opposite field type is forestalled until the occurrence of the first occurring intraframe encoded field of that type, which occurs a known number of fields after the detection of the first intraframe encoded field.

Assume that the first intraframe encoded field is odd. Successive odd fields are decompressed and provided by the buffer memory 47 to the multiplexer 51. At this juncture several options are available regarding display of the received data. The first is to write the odd fields to the odd field lines of the display RAM 52, and to set the even field lines of the display RAM to an, e.g., intermediate gray value, and display the image. A second is to write the odd field data to the odd field lines of the display RAM, then read the same odd field data from the buffer memory 47 a second time, and write it to the even field lines of the display RAM, and display the image. The second option will provide a brighter image than the first option and with apparent greater resolution. A third option is to write the odd field data to the odd field lines of the display RAM, then to read the same field from the buffer memory 47 and apply same to an interpolator 50 via a multiplexer 49. The interpolator 50 may be arranged to generate interpolated lines of data from successive pairs of lines of the odd field signal (vertical averaging), thereby producing pseudo even lines of data which are subsequently written to the even field lines of the display RAM 52. This option will produce images which have apparent greater resolution than the second option.

The particular option employed is programmed into the controller 42, and is part of the start-up cycle. The controller, responsive to the data provided by the transport processor 43, controls the reading of the data from the appropriate buffer memory 47 or 48 (depending whether the first intraframe encoded field is odd or even) and controls the switching of the multiplexers 49 and 51. For example, considering the third option and assuming that the first intraframe encoded field is odd, the buffer memory 47 is conditioned to read each field of signal twice, the multiplexer 49 is conditioned to pass signal from buffer memory 47, and the multiplexer 51 is conditioned to alternately pass fields of signal from the buffer memory 47 and the interpolator 50. After a predetermined number of fields have been processed in this manner the controller switches to the steady state control cycle to decompress data from both odd and even field types.

As indicated earlier, the transport processor may provide error flags indicative of lost or uncorrectable errors. To ameliorate potential unacceptable image corruption from such errors or lost data, the controller may be arranged to condition the receiver system to substitute noncorrupted signal. For instance, if the lost or erroneous data occurs in an intraframe encoded field, the controller may be arranged to revert to processing similar to the above described option three (except that there is no need to wait for a first intraframe encoded field, assuming that the lost data only occurred in an odd or an even field; alternatively if data is lost in both odd and even fields, the controller will revert to the start-up cycle). If data is lost in a P field the controller may again be arranged to condition the system to operate as per option three. Alternatively, if data is lost from a B field, the controller may be arranged to condition the system to replace this data, on a single field basis, or partial field basis, with interpolated data as per options two or three.

What is claimed is:

1. A system for compressing video data comprising:
    a source of video signal for providing a sequence of ordinally numbered fields of video signal, successive pairs of odd and even numbered fields forming frames of video signal;
    compression means, responsive to said video signal, for compressing odd numbered fields of said video signal independent of said even fields, and for compressing even numbered fields of said video signal independent of said odd fields, said compression means encoding ones of said odd fields according to an intraframe compression mode and others of said odd fields according to a predictive compression mode, and encoding ones of said even fields according to an intraframe compression mode and others of said even fields according to a predictive compression mode, and wherein said even fields compressed according to said intrafield compression mode are from different frames than said odd fields compressed according to said intraframe compression mode; and
    means for transmitting the said compressed fields.

2. The system set forth in claim 1 wherein even numbered fields that are intraframe compressed occur in said sequence midway between successive odd numbered fields that are intraframe compressed.

3. The system set forth in claim 1 wherein intraframe compressed even numbered fields are evenly interspersed between successive intraframe compressed odd numbered fields.

4. The system set forth in claim 1 wherein said source comprises:
    means for providing fields of video signal; and
    means, coupled to said means for providing fields of video signal, and having first and second output ports, for alternately providing successively occurring fields at said first and second output ports.

5. The system set forth in claim 4 wherein said compression means comprises:
- a first video compressor, coupled to said first output port for compressing said odd numbered fields, said first video compressor being programmed to compress every $N^{th}$ occurring odd numbered field according to said intraframe compression mode, where N is an integer greater than 3;
- a second video compressor, coupled to said second output port for compressing said even numbered fields said second video compressor being programmed to compress every $M^{th}$ occurring even numbered field according to said intraframe compression mode, where M is an integer greater than 3; and
- means for multiplexing compressed even and odd numbered fields.

6. The system set forth in claim 1 wherein said means for transmitting includes means for segmenting said combined fields into transport blocks including indicia for identifying respective fields.

7. The syatem set forth in claim 1 wherein said compression means is programmed to compress every $N^{th}$ occurring odd numbered field according to said intraframe compression mode, where N is an integer greater than 3, and is programmed to compress every $M^{th}$ occurring even numbered field according to said intraframe compression mode, where M is an integer greater than 3.

* * * * *